(12) United States Patent
Essling

(10) Patent No.: US 7,838,813 B2
(45) Date of Patent: Nov. 23, 2010

(54) LIGHT BEAM RECEIVER WITH INTERFERENCE SIGNAL SUPPRESSION

(75) Inventor: Mirko Essling, Kellenbach (DE)

(73) Assignee: AndroTec GmbH, Waldfischbach-Burgalben (DE)

( * ) Notice: Subject to any disclaimer, the term of this patent is extended or adjusted under 35 U.S.C. 154(b) by 425 days.

(21) Appl. No.: 12/059,401

(22) Filed: Mar. 31, 2008

(65) Prior Publication Data

US 2009/0244520 A1 Oct. 1, 2009

(51) Int. Cl.
*H01L 31/00* (2006.01)

(52) U.S. Cl. .................. 250/214.1; 250/214 R

(58) Field of Classification Search .......... 250/214.1, 250/214 R, 559.29, 559.3; 356/4.01–5.13
See application file for complete search history.

(56) References Cited

U.S. PATENT DOCUMENTS

| | | | |
|---|---|---|---|
| 5,471,049 A | 11/1995 | Cain | |
| 6,873,413 B2 | 3/2005 | Douglas | |
| 7,110,092 B2 | 9/2006 | Kasper et al. | |
| 7,394,527 B2 * | 7/2008 | Essling et al. | ............... 356/4.01 |
| 2006/0082790 A1 | 4/2006 | Zalusky | |

OTHER PUBLICATIONS

Kodenshi Corp., "Pin Photodiodes," Aug. 2007 (2 pages).

* cited by examiner

*Primary Examiner*—Que T Le
(74) *Attorney, Agent, or Firm*—Frederick H. Gribbell

(57) ABSTRACT

An improved laser light beam receiver rejects unwanted pulses of optical energy, such as strobe lights or other flashes of light, that can occur on a jobsite. The receiver analyzes a light beam reception by using a photosensitive light beam detector arrangement and a separate photoelectric detector serving as an interference signal detector. This additional detector is not easily able to detect the light beams needed in normal operation. On the other hand, the additional detector does detect mostly all interfering light flashes—caused by flash lamps and other similar devices—whose threshold limit is either at the same level or below that of the light beam detector arrangement. An evaluating circuit such as a microcontroller correlates the time of reception of the light beam detector arrangement and the interference signal detector in order to discard the result if the times of reception correspond to a major extent.

18 Claims, 2 Drawing Sheets

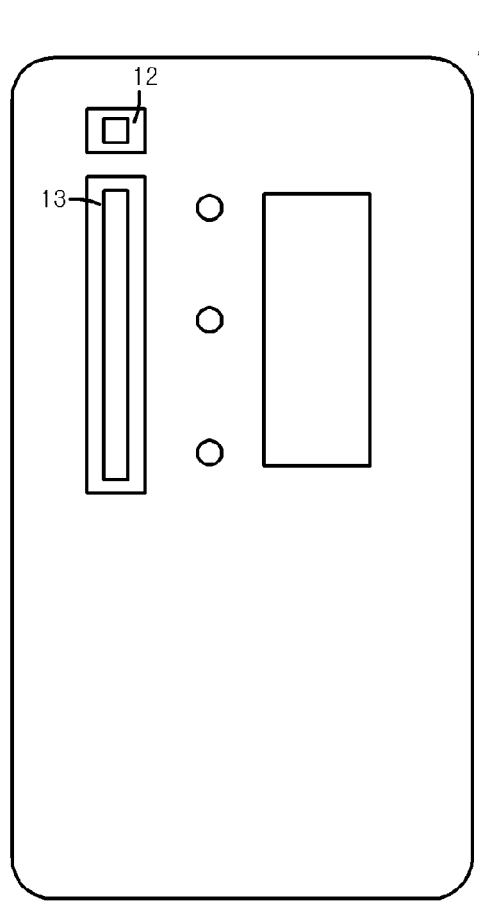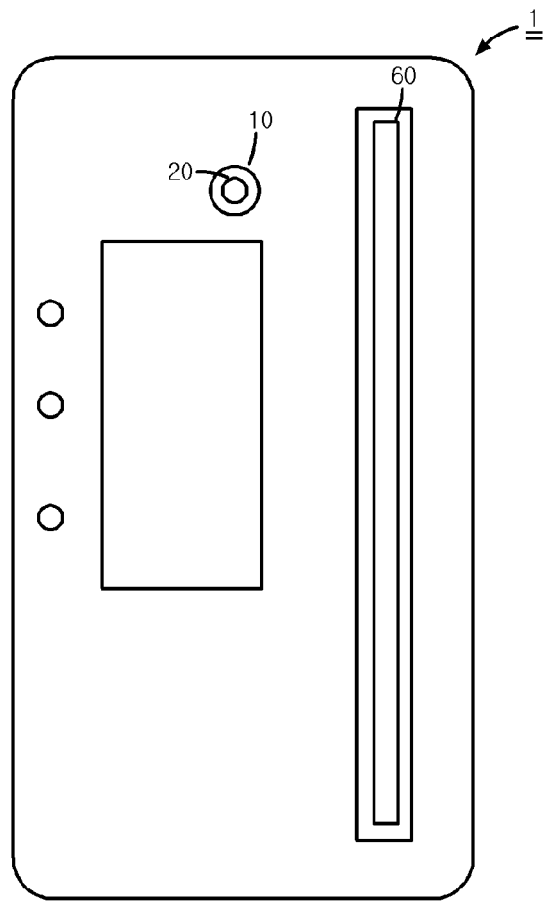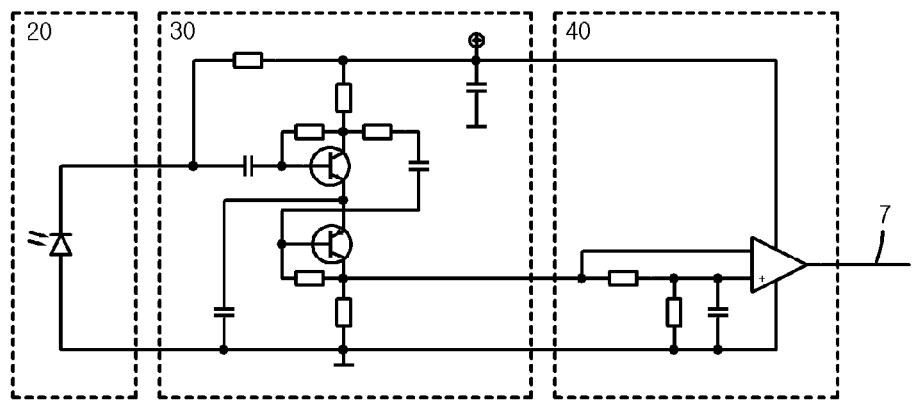
FIG. 1
FIG. 2
FIG. 3

LIGHT BEAM RECEIVER WITH INTERFERENCE SIGNAL SUPPRESSION

TECHNICAL FIELD

The present invention relates generally to laser receiver equipment and is particularly directed to a laser receiver of the type which detects position laser beams to determine physical elevation of the laser receiver. The invention is specifically disclosed as laser receiver that rejects unwanted pulses of optical energy, such as strobe lights or other flashes of light that can occur on a jobsite.

BACKGROUND OF THE INVENTION

Light beam receivers are required where light beams are used for surveying. They are typically applied with, e.g., rotation lasers that are used on construction sites and similar. In order to be able to use the different types of radiated laser light, special light beam receivers are required. Examples of different types of radiated laser light include a punctiform beam rotating or in motion, a stationary or moving fan beam, or a laser plane fanned out by means of conic mirrors.

For example, if a punctiform horizontal laser beam rotates around an exactly vertically aligned axis of rotation, such light beam detectors can be used to carry out precise measurements of elevation. For this purpose photo-electric detector components are provided as detectors which, when laser beams are received, allow the receivers to measure the elevation independently of their position considering the radiated level of reference.

The photodetectors provided are usually embodied as one of the following: a quasi-linear detector line (as disclosed in U.S. Pat. No. 5,471,049); or a light conductor based PSD (photosensitive detector), as disclosed in U.S. Pat. No. 7,110,092 of the applicant; or an arrangement of several individual detector elements which are identical but, due to the respective height, of different electronic weighting regarding their sensitivity (as disclosed in U.S. Pat. No. 6,873,413); or, in the simplest case, two photo-electric devices of the same size arranged on top of each other.

More or less all of the photo-electric detector arrangements described above are suitable for height-resolving or location-resolving laser reception if supported by suitable evaluation means. However, when the practical application of these light beam receivers is concerned, it must be considered that they are usually exposed to sources of interference signals which can falsify the measuring results. In the worst case there might be a display of measurement results even though no laser beams were received.

On construction sites typical sources of interference are, e.g., fluorescent lamps, flash lamps at construction machines and light flashes emitted by electric welding apparatus. Although it has already been possible to sufficiently suppress the interference emitted by fluorescent lamps for many years (e.g., by high-pass filtering of the electric detector signals), the light beam receivers available on the market so far have offered only insufficient suppression of light flashes, and then the only alternative for the user had been to wait until the interference had disappeared.

Such interfering light flashes also contain energy of a wavelength range of usually 530 to 790 nm at which common construction lasers operate. Therefore, it is not possible to use only one simple optical filter (like the commonly used red or green optical filters) as part of the detector arrangement in order to effectively suppress these interfering light flashes.

Instead, a possible technique to suppress these interfering influences is described in US 2006/0082790. This document describes the use of an additional photo detector—to be mounted either below or above the detector line—which is located behind a separated window inside the housing of the light beam receiver. The sensitivity of the detector lies in the same wavelength range as the one of the detector line, thus being especially suitable for the laser pulses.

Here two cases can be assumed: either, the laser beam, i.e., the "wanted" signal, does not hit both the additional detector and the detector line itself at the same moment of real time; or, the intensities measured at the detector line and at the additional detector can be used to decide whether the laser reception nevertheless is interference-free. If not, an interference signal, or an interfered wanted signal, is present but it is not shown on the display.

Practical experience has shown that this procedure is very useful when it comes to suppressing light flashes caused by flash lamps. However, where strongly expanded laser beams are concerned, which regularly occur at larger distances and at poorly collimated lasers, it has been observed that these types of laser beams cannot be measured at the edge of the elevation measuring range, since the receiver mistakes them for an interference signal. This is due to the fact that strong portions of the signal hit the additional detector as well as the opposite side of the detector line. A possible solution would be to mount the additional detector at a larger distance either above or below the detector line. However, this possible solution is not preferable, as the dimensions of the device would be overly enlarged, and the necessity to mount the detector either above or below the detector line arrangement of the light beam receiver in the first place can already be regarded as a needless and impractical enlargement. A further disadvantage is the fact that such an additional detector would require an amount of electronic processing comparable to that of the detector line intended for the laser reception, including, e.g., variable gain amplifiers, peak detectors and integrators, or the like.

SUMMARY OF THE INVENTION

Therefore it would be an advantage to provide an improved light beam receiver that does not feature any of the disadvantages mentioned above.

The present invention includes a light beam receiver for analyzing a light beam reception by using a photoelectric light beam detector arrangement and a separate photoelectric detector serving as an interference signal detector. Due to its construction or to a filter medium in place, this additional detector is not easily able to detect the light beams needed in normal operation. On the other hand, the additional detector is able to detect most of all interfering light flashes—caused by flash lamps and other similar devices, which have a rather wide optical emission spectrum and having a threshold limit that is either at the same level or below that of the light beam detector arrangement.

One mode of the present invention provides an optoelectronic detector that would be sufficiently insensitive to, e.g., the laser light of a rotation laser, and instead is specially designated for detecting interference signals. An evaluating circuit such as a microcontroller could be used to timely correlate the reception of the light beam detector arrangement and the interference signal detector in order to discard the measured result if the times of reception correspond to a major extent.

In an exemplary mode of the present invention, the release sensitivity of the interference signal detection is too low with regard to detecting the wanted signals, and therefore, the interference signal detector can be mounted anywhere on the enclosure, i.e., especially in areas that are usually hit by the normal laser beam.

The wavelength range of common construction lasers as well as those of the optical spectra of noble gas flash lamps or of light arc discharges caused by electric welding overlap to a certain extent, but these spectra expand into the infrared area in a quasi-continuous way. Therefore, a commonly available photodiode with an optical low-pass filter inserted—which is able to suppress wavelengths below 800 nm at a ratio of more than 1:100—would make an excellent interference signal detector.

The optical low-pass filter may be a filter window made of plastic colored with suitable coloring agents and mounted in front of the interference signal detector. Likewise, the plastic enclosure of the photodiode itself may be colored accordingly; even dielectric layers directly placed on the chip of the photodiode would be possible. A further option would be to use semiconductor materials for the photodiode to desensitize it in the frequency range in question, e.g., materials such as PbS, InGaAs, and the like.

Many flash lamps are colored in orange, red, green and blue using optical filters. However, it has been shown that optical filters which have a noteworthy share in the range of common laser wavelengths also have a share in the more remote infrared area at the same level or above. Therefore the inventive principles discussed above can also be used to suppress even such colored sources of light flashes.

A light beam receiver which serves as the basis of a preferred embodiment of the present invention, but is not equipped with any measures against pulsed interference signals, is disclosed in the patent specification of the applicant PCT/DE 2005/001989. The disclosure of this patent specification is incorporated by reference herein, in its entirety.

Additional advantages and other novel features of the invention will be set forth in part in the description that follows and in part will become apparent to those skilled in the art upon examination of the following or may be learned with the practice of the invention.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 1 is a front view of a typical light beam receiver for manual operation, equipped with an additional detector for interference signal suppression, as known in the prior art.

FIG. 2 is a front view of a preferred embodiment of the present invention, of a light beam receiver 1 for manual operation, constructed according to the present invention and including the following components: a light beam detector arrangement 60, an interference signal detector 20 mounted behind a window 10 (which could be an optical filter), and indicating display components.

FIG. 3 is a schematic diagram of the electronics for receiving interfering signals, for use with the light beam receiver of FIG. 2, comprising an interference signal detector 20 embodied as a photodiode, an amplifying and filtering circuit 30, and a threshold limit detector 40.

DETAILED DESCRIPTION OF THE PREFERRED EMBODIMENT

Figure 4:
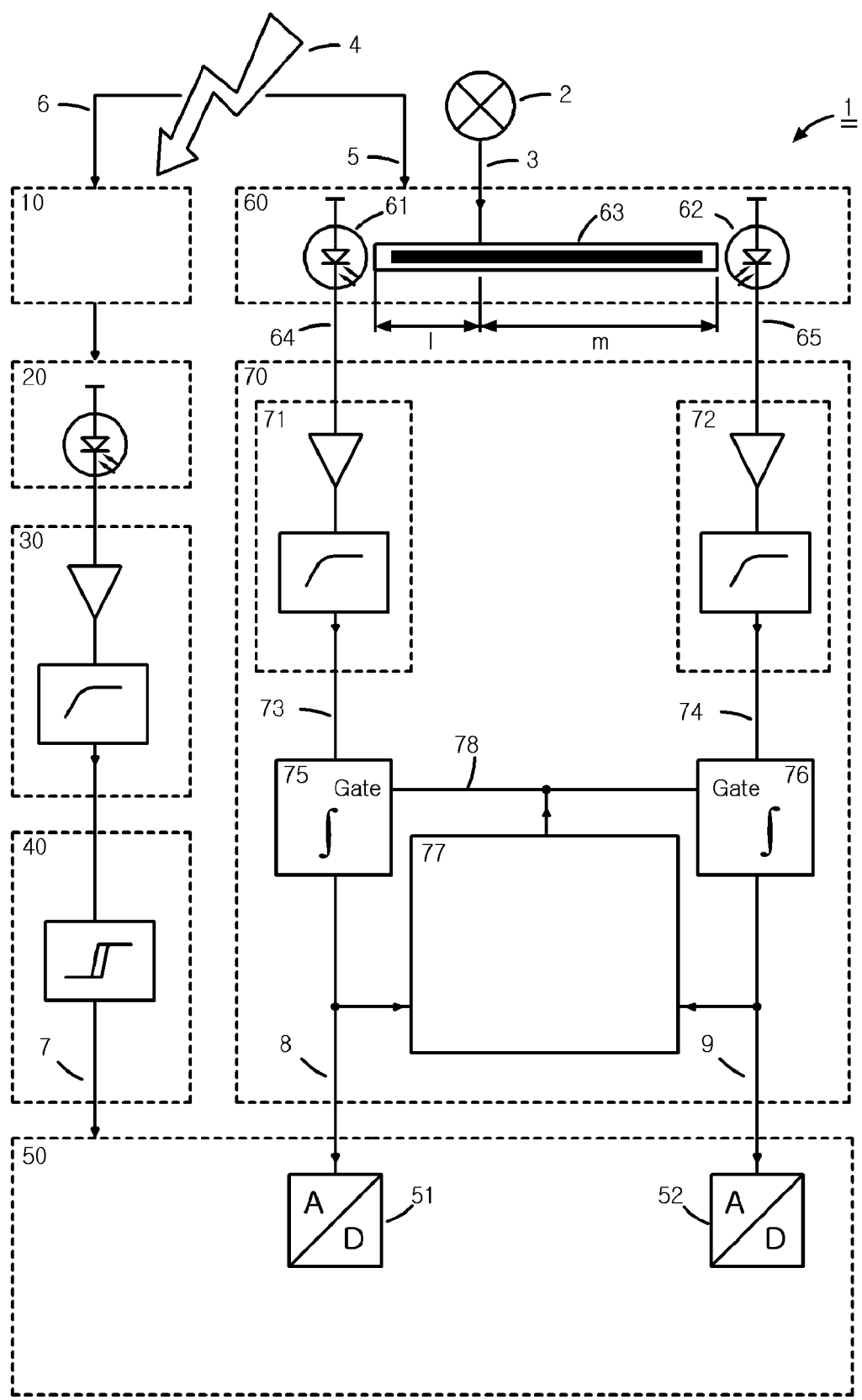
FIG. 4 is a block diagram of the major electronic components for constructing the light beam receiver of FIG. 2, including a light beam detector arrangement 60, a signal processing unit 70, an evaluating circuit 50, an optical filter 10, an optical interference signal detector 20, a medium amplifying and filtering interference signals 30, and a threshold limit detector 40.

Reference will now be made in detail to the present preferred embodiment of the invention, an example of which is illustrated in the accompanying drawings, wherein like numerals indicate the same elements throughout the views.

The prior art laser receiver 11 shown in FIG. 1 represents the conventional approach described above, i.e., to use an additional photo detector 12. It can be seen that this photo detector is located directly above the detector line 13. Likewise the display components can be recognized. The device shown here is a handheld laser receiver to be used in conjunction with rotating laser light sources.

The handheld receiver shown in FIG. 2, designed according to the present invention, is constructed according to a preferred embodiment of the present invention, as described herein. It contains a considerably longer light detector arrangement 60 that stretches nearly across the whole length of the enclosure, behind a window. The use of a variant of such length and of a specifically ergonomic application can be possible if the interference signal detector 20 will be located next (or proximal) to the light detector arrangement, but not necessarily in line with the vertical axis of the light detector arrangement 60. The interference signal detector 20 is mounted behind a window 10, which could be an optical filter if desired.

FIG. 3 shows a detailed circuit diagram of the electronics used for receiving the interference signals which comprise the interference signal detector 20, implemented as a photodiode, and a signal conditioning circuit which includes an amplifying and filtering circuit 30, and a threshold detector 40. This circuitry can be implemented at very low cost, especially if the microcontroller used within the evaluating (or signal processing) circuit is already equipped with an integrated analog comparator to determine the threshold value. Compared with prior art receivers, no additional integrators, peak value detectors, variable gain amplifiers, or A/D converting channels will be necessary.

In an exemplary embodiment of the present invention, the interference signal detector 20 is a silicon PIN photodiode, Part No. HPI6FGR4, sold by Kodenshi Corporation, and the window 10 is substantially clear. The HPI6FGR4 contains its own optical filter, which acts as a visible light cut-off filter, which provides the exemplary interference signal detector 20 with a spectral sensitivity of about 880-1050 nm. For the purposes of the present invention, a cut-off frequency could be as low as 850 nm, or even perhaps as low as 800 nm, which would still be substantially insensitive to standard laser transmitters that output laser beams at 630 nm, 670 nm, or even as high as 790 nm.

It will be understood that it is the combination of the actual photosensor element and any optical filter that is important. If the photosensor by itself has a wavelength sensitivity above 850 nm, for example, then no optical filters will be needed at all, either on the sensor itself, or for the window 10 of the housing of the laser receiver. In general, the wavelength sensitivity for the interference signal detector "system" (i.e., the combination of the sensor and any optical filter), should be above about 800 nm, or more preferably, above 850 nm.

FIG. 4 shows a block diagram for constructing a preferred embodiment of the light beam receiver shown in FIG. 2. This variant of FIG. 4 comprises a light beam detector arrangement 60, a signal processing unit 70, an evaluating circuit 50, the optical filter 10, the interference signal detector 20, the circuit for amplifying and filtering interference signals 30, and the threshold limit detector 40. This version of the light beam receiver 1 is designed according to the present invention, and works as follows:

If the light beam receiver is moved into a position where a moving laser beam 3, emitted by a source of laser light 2, falls onto a light-sensitive area of a light-detecting sensor (also referred to herein as a light "rod" sensor) 63 relating to the distances "l" and "m" of the light beam detector arrangement 60, then two electrical signals 64 and 65 are generated by two optical sensors 61 and 62 that are placed proximal to the ends of the light rod 63. The light rod sensor 63 is an exemplary photodetecting device such as that described in U.S. Pat. No. 7,110,092, titled "MEASURING DEVICE AND MEASURING METHOD FOR DETERMINING DISTANCE AND/OR POSITION," by the same inventor(s), which is incorporated herein by reference in its entirety.

The light beam sensing arrangement 60 mainly comprises a longitudinal light conductor (or "rod") 63 that has at least one photosensor element 61 or 62 positioned at (or near) each of its two distal ends. When a light beam strikes the rod conductor 63, that light beam is radially coupled into the longitudinal light conductor 63, and the beam then splits and travels toward both distal ends of the light conductor 63. When the coupled light beams reach their respective distal ends, they exit the conductor 63 and each exiting beam impacts its proximal photosensor element 61 or 62. The relation of magnitudes of the two light impacts on the two spaced-apart photosensors gives an indication of the dimensions l and m, and thus the position where the light beam struck the light conductor 63. The photosensors 61, 62 can be virtually any type of optoelectronic sensor for most purposes, such as a standard photocell that generates current when receiving photons (e.g., a photodiode or phototransistor), or perhaps a photovoltaic cell.

The signal processing circuit 70 receives the output signals 64 and 65 from the photosensors 61 and 62, respectively, of the light beam detector arrangement 60. Signals 64 and 65 are directed to a pair of amplifying and filtering circuits 71 and 72, respectively, and these circuits produce filtered signals 73 and 74, respectively. Signals 73 and 74 are directed to a pair of integrator circuits 75 and 76, respectively, which output voltage signals 8 and 9, respectively. The voltage signals 8 and 9 are also directed to an integration timing and limiting circuit 77, which provides a feedback/gate signal 78 for the integrators 75 and 76, mainly to start/stop the integration simultaneously in both integrators and thus produce a quasi-automatic gain behavior.

Thus the two signals 64, 65 are converted into two voltage values 8 and 9 by the signal processing unit 70; then, in turn, these values are converted into digital values by the evaluating circuit 50, e.g. a microcontroller which includes analog-to-digital (A/D) converters 51 and 52. By inspecting these two digital values the evaluating circuit 50 is able to determine the position of the laser beam impact (at 3) by determining the distances l or m, and to display a corresponding numeric value, or to generate a similar corresponding external analog or digital signal or visual indication.

In an exemplary laser receiver according to the present invention, the photosensor elements 61 and 62 are silicon photodiodes, Part No. BPW46L, sold by Vishay. Such photodiodes have a "normal" silicon photo response curve, and will respond to laser light beams transmitted in the standard wavelengths of 630 nm, 670 nm, or 790 nm. The exemplary laser receiver may also have an optical filter that covers the light beam detector arrangement 60, although this optical filter mainly is used to limit the effect of sunlight entering this portion of the laser receiver 1. In other words, a "standard" silicon photodiode would be acceptable without optical filtering, with regard to the operating principles of the present invention.

If now a light flash is generated by a source of interfering light 4 (such as a strobe light, or other type of intermittent light pulse), of which a portion 5 falls onto the light beam detector arrangement 60 (at the photosensor 63), then this light flash or pulse may cause an incident in the subsequent parts of the analog processing circuitry which the evaluating circuit may not be able to distinguish from a "standard" laser beam reception. Thus, this incident would usually (using conventional devices) lead to the display of a false measuring value, that could be almost arbitrary.

However, in the illustrated embodiment 1 of the present invention, a certain portion 6 of the light pulse (or light flash) also falls through the optical filter 10 onto the interference signal detector 20. The electrical output signal of this detector is further amplified and filtered by the interference signal amplifying and filtering circuit 30 before it reaches the threshold limit detector 40, where the signal is compared to a predetermined threshold value. If this threshold value is exceeded (i.e., if a sufficiently strong interference signal is determined), then this result will be signaled via the comparator output signal 7.

The evaluating circuit 50 recognizes the virtually simultaneous occurrence of the comparator signal 7 and the signals 8 and 9 output by the signal processing unit 70, and the evaluating circuit 50 is thus able to suppress any false reading caused by the received interference signal. Therefore, the evaluating circuit 50 will be able to determine when the comparator signal 7 (that is output from the threshold detector 40) occurs substantially at the same real time instant as the "wanted" light beam signals 8 and 9 (that are output from the signal processing unit 70). If these signals do simultaneously occur (within a predetermined time tolerance), then the receiver's overall microcontroller will not display a position reading based on that particular sample of a light beam strike on the light beam detector arrangement 60.

On the other hand, if a laser beam (the "wanted" signal) falls on the optical filter 10, it is attenuated by the filter to such an extent that it will not trigger the comparator signal 7. If this same laser beam also strikes the photosensor 63, then its position of impact will be determined by the signal processing unit 70 and the evaluating circuit 50, and this reading will be accepted and displayed on the laser receiver 1. In other words, since the evaluating circuit 50 did not detect an "unwanted" pulse signal at 7, then it was able to confidently evaluate and display the "wanted" signal that was received at 8 and 9.

It will be understood that an external evaluation circuit could be used for determining whether or not a reading should be suppressed. A machine control box, for example, could make that decision, and then quickly output a signal to the laser receiver to prevent a new reading from being displayed or used (by the machine) during a particular instance of an optical noise signal (or strobe light) striking the receiver.

It should be noted that the signal conditioning circuit used for the optical interference signal detector 20 (i.e., the amplifier and filter 30, and the threshold detector 40) do not include such complex components as a variable gain amplifier, an integrator stage, or a peak detector circuit. This not only makes the illustrated design of the present invention less expensive to produce, but also makes its operation more reliable, including less prone to calculation errors. In conventional designs for strobe light or pulsed light rejection circuits, such complex components are the norm.

It will be understood that other types of photosensors could instead be used with the remainder of the circuit depicted in FIG. 4, without departing from the principles of the present invention. In other words, conventional multiple photocell arrangements may be used to generate signals that will be evaluated and have the position of impact determined by their own types of special signal processor devices. If desired, the results of such conventional laser beam receivers could be used along with the combination of an interference signal detector 20, amplifying and filtering circuit 30, and threshold limit detector circuit 40, that outputs the "unwanted" pulse signal 7 to the evaluating circuit 50.

The particular receiver presented here is a handheld device used for simple elevation measuring and similar. In addition to this, however, it is also possible to apply the procedure of interference signal suppression presented herein to light beam receivers used for construction machine controls, camera systems, light barriers and other systems of optical sensing or positioning. Also it is not a mandatory requirement to use movable light beams; other options would include a static spatial radiation, e.g. of pulsed fanned out light beams, or some other similar arrangement.

As used herein, the term "proximal" can have a meaning of closely positioning one physical object with a second physical object, such that the two objects are perhaps adjacent to one another, although it is not necessarily required that there be no third object positioned therebetween. In the present invention, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

All documents cited in the Background of the Invention and in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. A light beam receiver to analyze the reception of a light beam using a light beam detector arrangement comprising: (a) at least one light beam sensor for detecting "wanted" light beams, which generates at least one first electrical signal; and (b) an optical interference signal sensor for detecting "unwanted" light signals, which generates a second electrical signal;
   wherein: said optical interference signal sensor exhibits a sensitivity that is substantially in a first wavelength range which:
   (c) does not substantially overlap with a second wavelength range that includes light sources that are to be detected by said at least one light beam sensor, and
   (d) does extend into a wavelength range that contains interfering light emissions.

2. The light beam receiver of claim 1, wherein said interfering light emissions are produced by sources of light which emit light pulses or sequences of light pulses.

3. The light beam receiver of claim 1, wherein said "wanted" light beams are produced by a source of laser light.

4. The light beam receiver of claim 3, wherein said source of laser light emits a movable beam of light.

5. The light beam receiver of claim 1, further comprising an optical filter that is placed in the optical path of the interference signal sensor.

6. The light beam receiver of claim 1, wherein said at least one light beam sensor receives light from a longitudinal light conductor.

7. The light beam receiver of claim 1, wherein said at least one light beam sensor comprises: (a) a light conductor having a longitudinal shaft with two distal ends; and (b) two spaced-apart light beam detectors that are, one each, positioned proximal to said two distal ends;
   wherein if a light beam to be analyzed strikes said longitudinal shaft of the light conductor, the light beam is radially coupled into the conductor and splits into two separate light beams that travel through the light conductor until exiting at said two distal ends, and then impact on said two spaced-apart light beam detectors, which then generate two of said at least one first electrical signal.

8. The light beam receiver of claim 1, further comprising a signal conditioning circuit that amplifies and electrically filters the second electrical signal, and thereby creates a third electrical signal.

9. The light beam receiver of claim 8, wherein said signal conditioning circuit includes a threshold limit detector that emits a fourth electrical signal if said third electrical signal has a magnitude that exceeds a predetermined threshold value.

10. The light beam receiver of claim 1, further comprising a signal processing circuit and an evaluating circuit that receive and analyze said at least one first electrical signal, and displays a measuring value.

11. The light beam receiver of claim 10, (a) further comprising a signal conditioning circuit that amplifies and electrically filters the second electrical signal, thereby creating a third electrical signal, in which said signal conditioning circuit also includes a threshold limit detector that emits a fourth electrical signal if said third electrical signal has a magnitude that exceeds a predetermined threshold value;
(b) wherein said evaluating circuit suppresses displaying said measuring value if it identifies a timely correlation between reception of a related light beam being analyzed, and a change in the output of said fourth electrical signal of the threshold limit detector.

12. The light beam receiver of claim 1, wherein said at least one light beam sensor comprises: a plurality of individual photocells that are electrically connected to provide positioning information of where said "wanted" light beam strikes said plurality of individual photocells, in the form of said at least one first electrical signal.

13. A light beam receiver to analyze the reception of a light beam, said receiver comprising:
(a) a light beam detector arrangement that includes:
(i) a light conductor having a longitudinal shaft with two distal ends, wherein if a light beam strikes said longitudinal shaft, the light beam is radially coupled into the light conductor and splits into two separate light beams that travel through the light conductor until exiting at said two distal ends;
(ii) a first light beam sensor that is positioned proximal to a first of said two distal ends, said first light beam sensor generating a first electrical signal when receiving optical energy from said light conductor; and
(iii) a second light beam sensor that is positioned proximal to a second of said two distal ends, said second light beam sensor generating a second electrical signal when receiving optical energy from said light conductor;
(b) an optical interference signal sensor for detecting "unwanted" light signals which, if it receives an optical signal within its sensitivity range, generates a third electrical signal;
(c) a signal processing circuit and an evaluating circuit that receive and analyze said at least one first and second electrical signals, for substantially determining a position where said light beam strikes said longitudinal shaft of the light conductor;
(d) a signal conditioning circuit that includes:
(i) an amplifier stage;
(ii) an electrical filter stage; and
(iii) a threshold limit detector stage;
(e) wherein said signal conditioning circuit receives said third electrical signal from said optical interference signal sensor, and
(i) if said threshold limit detector stage receives a sufficient predetermined signal magnitude that correlates in real time with reception of a light beam striking said light conductor, then said signal conditioning circuit prevents said evaluating circuit from displaying said position where said light beam strikes said longitudinal shaft of the light conductor; and
(ii) if said threshold limit detector stage does not receive a sufficient predetermined signal magnitude, then said signal conditioning circuit allows said evaluating circuit to display said position where said light beam strikes said longitudinal shaft of the light conductor.

14. The light beam receiver of claim 13, wherein said signal conditioning circuit does not include a variable gain amplifier, an integrator stage, or a peak detector circuit.

15. The light beam receiver of claim 13, wherein a wavelength range of sensitivity for said optical interference signal sensor includes wavelengths of typical optical interference signals.

16. The light beam receiver of claim 15, wherein a wavelength range of sensitivity for said optical interference signal sensor is relatively insensitive to a wavelength of a laser light of a rotation laser.

17. The light beam receiver of claim 13, further comprising an optical filter that is placed in the optical path of said optical interference signal sensor.

18. The light beam receiver of claim 17, wherein a wavelength range of sensitivity for a combination of: (a) said optical filter, and (b) said optical interference signal sensor, is relatively insensitive to a wavelength of a laser light of a rotation laser.

* * * * *